(12) United States Patent
Wong et al.

(10) Patent No.: US 7,880,393 B2
(45) Date of Patent: Feb. 1, 2011

(54) POWER-SAVING CIRCUIT

(75) Inventors: Shih-Fang Wong, Taipei Hsien (TW); Tsung-Jen Chuang, Taipei Hsien (TW); Lin-Kun Ding, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 651 days.

(21) Appl. No.: 11/874,915

(22) Filed: Oct. 19, 2007

(65) Prior Publication Data

US 2008/0142716 A1    Jun. 19, 2008

(30) Foreign Application Priority Data

Dec. 15, 2006    (CN) .......................... 2006 1 0157539

(51) Int. Cl.
*H05B 37/02*    (2006.01)

(52) U.S. Cl. ........................................ 315/149; 315/150

(58) Field of Classification Search ......... 315/149–151, 315/155–159, 200 R, 209 R, 246, 276, 291, 315/307
See application file for complete search history.

(56) References Cited

U.S. PATENT DOCUMENTS

| | | | |
|---|---|---|---|
| 4,746,809 A * | 5/1988 | Coleman et al. | 307/1 |
| 5,826,216 A * | 10/1998 | Lyons et al. | 702/143 |
| 6,304,180 B1 * | 10/2001 | Platner et al. | 340/567 |
| 6,369,517 B2 * | 4/2002 | Song et al. | 315/194 |
| 6,546,741 B2 | 4/2003 | Yun et al. | |
| 6,791,087 B1 * | 9/2004 | Okumura | 250/342 |

FOREIGN PATENT DOCUMENTS

CN    2235695 Y    9/1996

* cited by examiner

*Primary Examiner*—Douglas W Owens
*Assistant Examiner*—Minh D A
(74) *Attorney, Agent, or Firm*—Frank R. Niranjan

(57) ABSTRACT

A power-saving circuit is provided for saving electrical power by detecting a presence or absence of an object in a localized area. The power-saving circuit includes a sensor module, and a switch module connected to the sensor module. The detector is adapted for outputting a control signal at a first state when an object is detected in the localized area, and outputting a control signal at a second state when an object is detected not in the localized area. The switch module provides a stable DC voltage according to the control signal at the first state, and not provides the stable DC voltage according to the control signal at the second state.

13 Claims, 4 Drawing Sheets

US 7,880,393 B2

POWER-SAVING CIRCUIT

BACKGROUND OF THE INVENTION

1. Field of the Invention

The present invention generally relates to power-saving circuits, more particularly, relates to a power-saving circuit with improved way of switching for saving electrical power.

2. Description of Related Art

Electrical energy is used to power electronic devices, e.g. computers, Personal Digital Assistants, etc. Such electronic devices may be equipped with power-saving functions not only to save power but also for extending the life of the electronic devices. As such, power-saving circuits are usually integrated with the electronic devices.

Referring to in FIG. 4, a conventional power-saving circuit 900 is used for saving electrical energy by detecting human activities in a localized area. The power-saving circuit 900 includes a passive infrared sensor 92, a processing circuit 93, a driving circuit 94, and a relay 95 that are serially coupled in that order. The processing circuit 93 includes a converting circuit 931 and an amplifying circuit 932 electrically connected to the converting circuit 931. The relay 95 is connected to a lamp 96. A power supply 91 is used for providing electrical power to the processing circuit 93, the driving circuit 94, and the lamp 96.

The passive infrared sensor 92 receives infrared rays emitted from an object such as a person in the localized area, and outputs a current signal to the processing circuit 93. The current signal is converted to a voltage signal by the converting circuit 931. The voltage signal outputted from the converting circuit 931 is amplified by the amplifying circuit 932. The driving circuit 94 receives the amplified voltage signal, and outputs a control signal indicating a presence of that person in the localized area. The relay 95 is switched on by receiving the control signal. Thereby, the lamp 96 is provided with electrical power. When that person leaves the localized area, the infrared sensor doesn't receive the infrared rays, therefore no voltage signal is supplied to the driving circuit 94. The relay 95 is switched off. As such, there is no electrical power supplied to the lamp 96.

However, the relay used in the power saving circuit 900 is a mechanical type switch, which may not contact well after working a period of time, such that the power-saving circuit wouldn't achieve a power saving object.

Therefore, a power-saving circuit with an improved way of switching for saving electrical power is needed in the industry to address the aforementioned deficiencies and inadequacies.

SUMMARY OF THE INVENTION

It is an aspect of the present exemplary power-saving circuit to provide an outputted Direct Current (DC) voltage when infrared rays emitted from an object or objects is or are detected in a localized area or a view range, so as to achieve an electrical power saving function. The power-saving circuit comprises a detector, a driving circuit, and a switch module. The detector is used for detecting infrared rays emitted from an object or objects, and outputting a voltage signal indicating whether the infrared rays are detected or not. The driving circuit is connected to the detector, and the driving circuit is adapted for receiving the voltage signal from the detector, and outputting a control signal at a first state and a control signal at a second state corresponding to the voltage signal being detected or not detected respectively. The switch module is connected to the driving circuit, and the switch module is adapted for outputting the outputted stable DC voltage when the control signal at the first state is inputted to the switch module, and not outputting the stable DC voltage when the control signal at the second state is inputted to the switch module.

BRIEF DESCRIPTION OF THE DRAWINGS

These and other advantages, and features of the present power-saving circuit will be apparent from the following description taken in conjunction with the accompanying drawings which illustrate a specific embodiment of the invention. In the drawings.

DETAILED DESCRIPTION OF THE INVENTION

Figure 1:
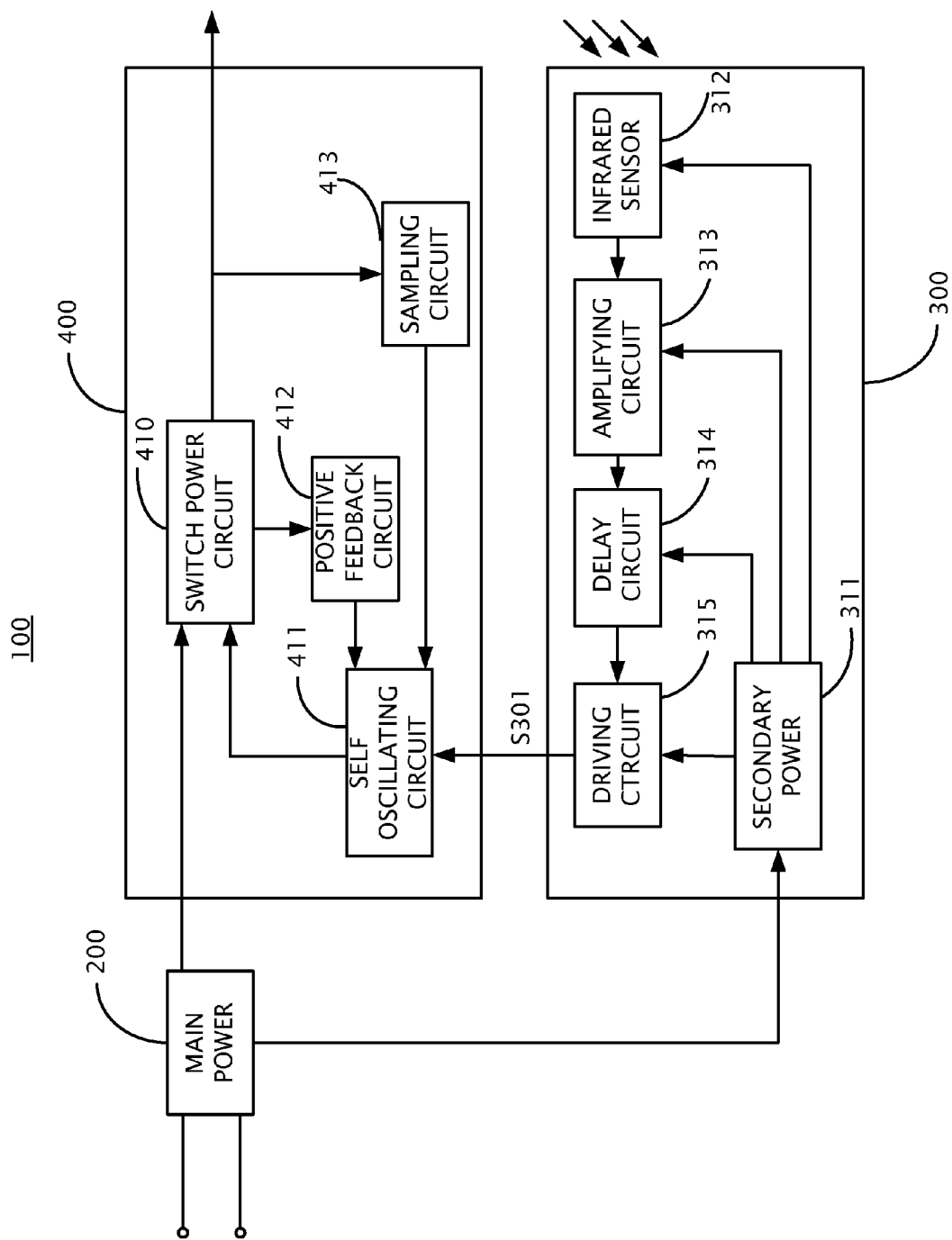
FIG. 1 is a block diagram showing a power-saving circuit in accordance with an exemplary embodiment, the infrared power-saving circuit including a main power, a sensor module, and a switch module.

Many aspects of the present power-saving circuit can be better understood with reference to the drawings. The components in the drawings are not necessarily to scale, emphasis instead being placed upon clearly illustrating the principles of the present power-saving circuit. Moreover, in the drawings, like reference numerals designate corresponding parts throughout several views.

Referring to FIG. 1, a power-saving circuit 100 is used for providing electrical power to various electronic devices, such as video surveillance devices, computers, consumer electronic devices, and so on. The power-saving circuit 100 includes a main power 200, a sensor module 300, and a switch module 400. The switch module 400 is electrically connected to the main power 200 and the sensor module 300.

The main power 200 is used for receiving an alternating voltage, and processing the alternating voltage to generate a pulsating DC voltage. The pulsating DC voltage generated by the main power 200 is supplied to the sensor module 300 and the switch module 400. The sensor module 300 is used for sensing a presence or absence state of an object or objects such as a person or persons in a localized area by detecting infrared rays emitted by the object or objects. The switch module 400 is used for selectively providing electrical power by responding to an output of the sensor module 300. When an object is detected in the localized area, the sensor module 300 outputs a presence control signal, causing the switch module 400 to be switched on, and the stable DC voltage is supplied. When an absence state of an object is detected, the sensor module 300 outputs an absence control signal, causing the switch module 400 to be switched off, and no stable DC voltage is outputted. The stable DC voltage indicates that a voltage doesn't change its amplitude with respect to the time.

The sensor module 300 includes an infrared sensor 312, an amplifying circuit 313, a delay circuit 314, and a driving circuit 315 connected in series in that order. The sensor module 300 further includes a secondary power 311 for providing DC voltages to the infrared sensor 312, the amplifying circuit 313, the delay circuit 314, and the driving circuit 315.

The infrared sensor 312 is used for receiving infrared rays emitted by the object or objects such as the person or persons, converting the infrared rays to a current signal, and outputting a voltage signal. The infrared sensor 312 is configured for detecting if the intensity of the infrared rays being received is higher or lower than a predetermined value. The predetermined value is related to a distance between the object and the infrared sensor 312 as is well known in the art. The amplifying circuit 313 is used for amplifying the voltage signal. The delay circuit 314 is used for holding the voltage signal a predetermined amount of time. The driving circuit 315 is used for receiving the delayed voltage signal and outputting a control signal S301. The control signal S301 indicates the absence or the presence of the person or persons in the localized area.

Although the sensor module 300 is shown as separate elements, that is, the infrared sensor 312, the amplifying circuit 313, and the delay circuit 314, the sensor module 300 may be implemented within a single processor.

The switch module 400 includes a switch power circuit 410, a self-oscillating circuit 411, a positive feedback circuit 412, and a sampling circuit 413. The switch module 400 receives the pulsating DC voltage from the main power 200, and outputs a stable DC voltage to a load (not shown). The switch module 400 functions like a Switching Mode Power Supply (SMPS) with a high efficiency. More detail of the elements incorporated within the switch module 400 and an operation in conjunction with the sensor module 300 will be described hereinafter.

Figure 2:
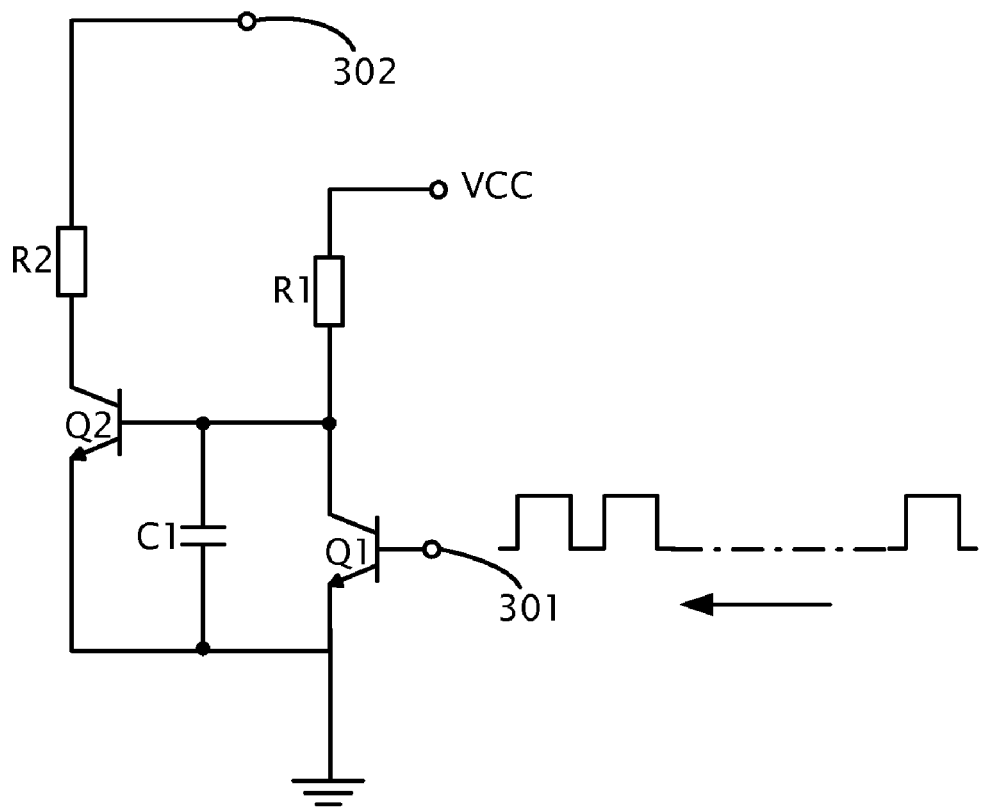
FIG. 2 is a detailed circuit diagram of a driving circuit of the sensor module in FIG. 1.

Referring to FIG. 2, the driving circuit 315 includes an input terminal 301 and an output terminal 302. The input terminal 301 is used for receiving the delayed voltage signal from the delay circuit 314. The output terminal 302 is used for outputting the control signal S301 to the switch module 400.

The driving circuit 315 includes a first Bipolar Junction Transistor (BJT) Q1, a second BJT Q2, a first pull-up resistor R1, a second pull-up resistor R2, and a capacitor C1. The first BJT Q1 and the second BJT Q2 are cascaded. The first BJT Q1 has its base connected to the input terminal 301 and its emitter connected to ground. A collector of the first BJT Q1 is connected to one terminal of the pull-up resistor R1 and the other terminal of the pull-up resistor R1 is connected to a voltage source Vcc from the secondary power 311 (see FIG. 1). The second BJT Q2 has its base connected to the collector of the first BJT Q1, and its emitter connected to ground. A collector of the second BJT Q2 is connected to one terminal of the pull-up resistor R2, the other terminal of the pull-up resistor R2 is connected to the output terminal 302. The capacitor C1 is coupled between the collector and the emitter of the first BJT Q1.

When the input terminal 301 receives the delayed voltage signal at a high level, the first BJT Q1 is turned on. The collector of the first BJT Q1 is pulled down to ground, causing a low level voltage signal to be produced at the collector of the first BJT Q1. The low level voltage signal is applied from the collector of the first BJT Q1 to the base of the second BJT Q2, and the second BJT Q2 is turned off. The second BJT Q2 is equivalent to a high impedance resistor, causing the output terminal 302 to be floated.

When the input terminal 301 receives the delayed voltage signal at low level, the first BJT Q1 is turned off. A high voltage signal is produced at the collector of the first BJT Q1. This high voltage signal at the collector of BJT Q1 is applied to the base of the second BJT Q2 and the second BJT Q2 is turned on. As a result, the output terminal 302 is pulled down to ground, and a low level voltage signal is produced at the output terminal 302.

Figure 3:
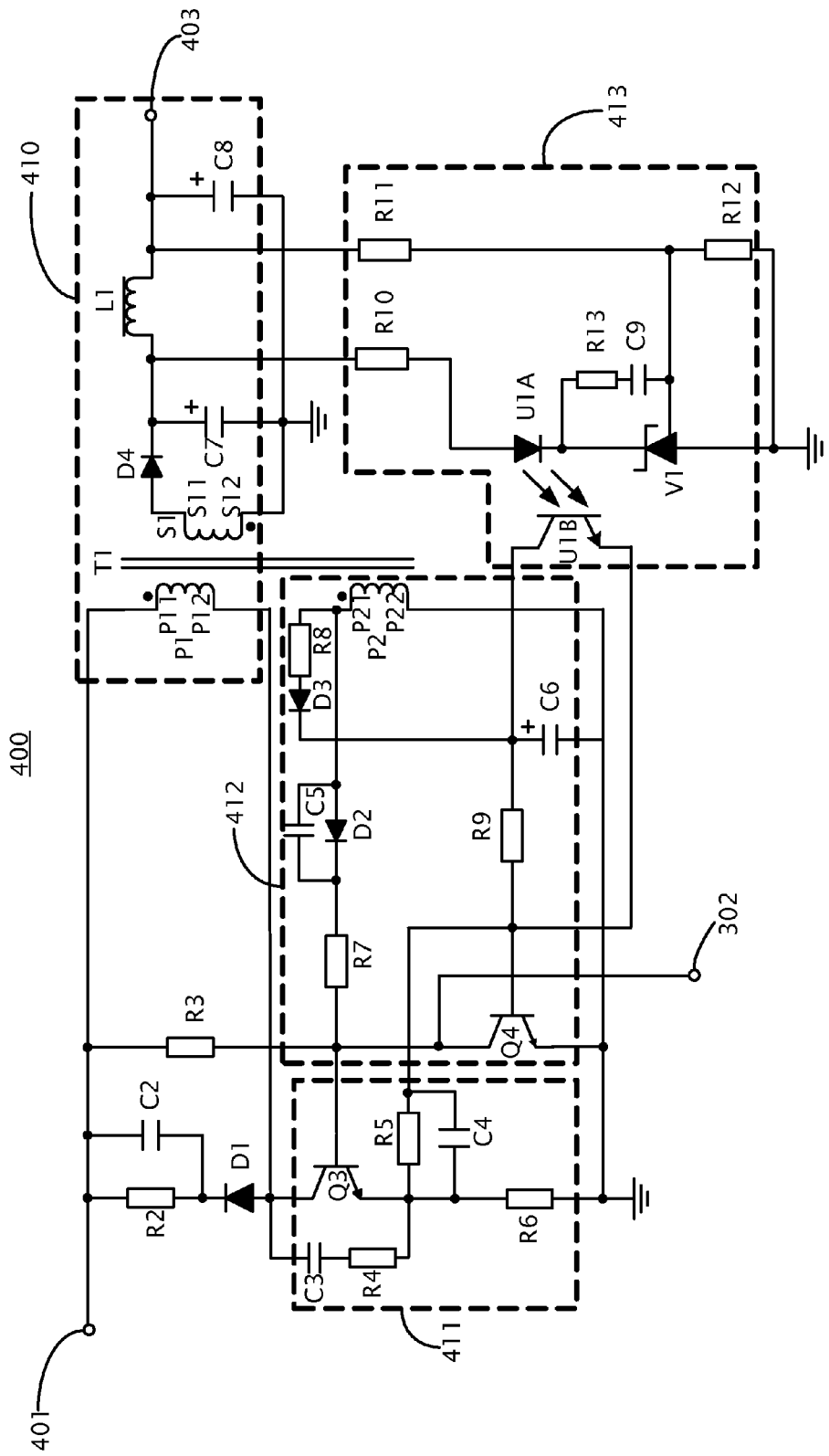
FIG. 3 is a detailed circuit diagram of the switch module in FIG. 1.
Figure 4:
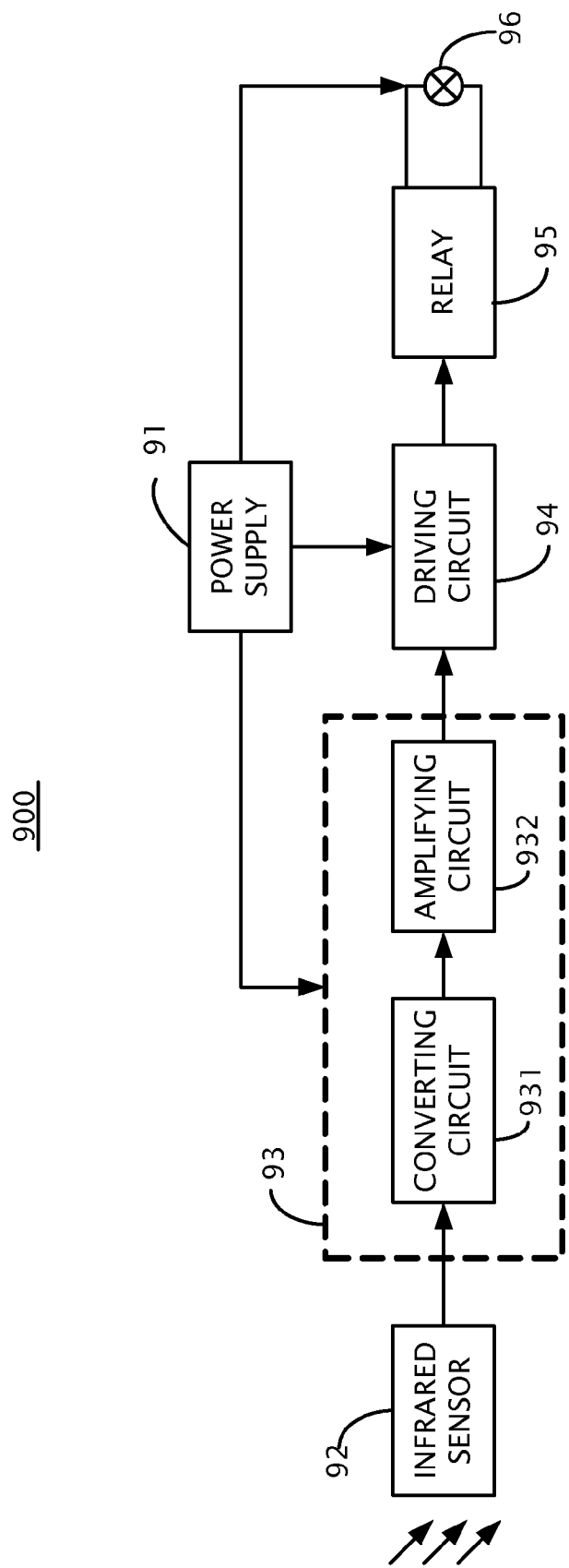
FIG. 4 is a block diagram showing a conventional power-saving circuit.

Referring to FIG. 3, the switch module 400 includes a first input terminal 401, a second input terminal 302, and an output terminal 403. The first input terminal 401 is used for receiving the pulsating DC voltage outputted from the main power 200. The second input terminal 302 is used for receiving the control signal S301 as depicted in FIG. 2. The output terminal 403 is used for outputting a stabilized DC voltage to the load.

The switched power circuit 410 includes a primary winding P1, a secondary winding S1, a diode D4, capacitors C7, C8, and an inductor L1. The primary winding P1 includes a first terminal P11, and a second terminal P22. The secondary winding S1 includes a first terminal S11, and a second terminal S12. The first terminal S11 of the secondary winding S1 is connected to an anode of the diode D4, the cathode of the diode D4 is connected to ground via capacitor C7. The inductor L1 has one terminal connected to the cathode of the diode D4. The other terminal of the inductor L1 is connected to the output terminal 403. The output terminal 403 is also connected to one terminal of the capacitor C8, the other terminal of the capacitor C8 is connected to ground. The operation of the switch power circuit 410 will be described hereinafter in the overall description of the operation the switch module 400.

As illustrated in FIG. 3, the self-oscillating circuit 411 is a Pulse-Width Modulation (PWM) type circuit. The self-oscillating circuit 411 includes a third BJT Q3, three resistors R4, R5, R6, and two capacitors C3, C4. The third BJT Q3 has its base connected to the second input terminal 302, its collector connected to the second terminal P12 of the primary winding P1, and its emitter connected to one end of the resistor R5 and one end of the capacitor C4. The other end of the resistor R5 and the other end of the capacitor C4 are connected together. An emitter of the third BJT Q3 is connected to ground via the resistor R6. The capacitor C3 has one end connected to the collector of the third BJT Q3. The other end of the capacitor C3 is connected to one end of the resistor R4. The other end of the resistor R4 is connected to the emitter of the BJT Q3. The operation of the self-oscillating circuit 411 will be described hereinafter in the overall description of the switch module 400.

The positive feedback circuit 412 includes a feedback winding P2 of the transformer Ti, resistors R7, R8, R9, capacitors C5, C6, diodes D2, D3, and a fourth BJT Q4. The feedback winding P2 includes two terminals P21, P22. The resistor R8, the diode D3, and the capacitor C6 are serially connected in that order between the terminals P21 and P22 of the feedback winding P2. The terminal P22 of the feedback winding P2 is also grounded. The terminal P21 is connected to an anode of the diode D2, a cathode of the diode D2 is connected to one terminal of the resistor R7, the other terminal of the diode D2 is connected to a collector of the fourth BJT Q4. The capacitor C5 is connected between the anode and the cathode of the diode D2. The fourth BJT Q4 has its base connected to one terminal of the resistor R9, the other terminal of the resistor R9 is connected to a node between the diode D3 and the capacitor C6. An emitter of the fourth BJT Q4 is connected to ground. The collector of the fourth BJT Q4 is also connected to the second input terminal 302. The operation of the positive feedback circuit 412 will be described hereinafter in the overall description of the switch module 400.

As illustrated in FIG. 3, the sampling circuit 413 includes resistors R10, R11, R12 R13, a capacitor C9, a light emitting diode U1A, a light receiving transistor U1B, and a reference voltage generator V1. One end of the resistor R11 is connected to ground via the resistor R12, and the other end of the resistor R11 is connected to a node between the inductor L1 and the capacitor C8. The resistor R10, the light emitting diode U1A, and the reference voltage generator V1 are serially connected in that order to ground. The serially connected resistor R13 and the capacitor C9 are connected between a cathode and a reference terminal of the reference voltage generator V1. The light receiving transistor U1B has its collector connected to one end of the resistor R9, and the other end of the resistor R9 is connected to an emitter of the light receiving transistor U1B.

In addition, the switch module 400 includes a resistor R2, a start up resistor R3, a capacitor C2 and a diode D1. One end of the start up resistor R3 is connected to the first input terminal 401, and the other end of the start up resistor R3 is connected to the base of the third BJT Q3. The resistor R2 is in parallel with the capacitor C2. The diode D1 has its anode connected to the collector of the third BJT Q3, its cathode connected to one terminal of the resistor R2.

An overall description of the switch module 400 incorporating the switch power circuit 410, the self-oscillating circuit 411, the positive feedback circuit 412, and the sampling circuit 413 will be described in detail.

The switch module 400 outputs a stable DC voltage by switching the third BJT Q3 between an ON state and an OFF state. The third BJT Q3 being changed from one ON state to a successive ON state can be viewed as one cycle. The transformer T1 is controlled to store or release magnetic energy based on the ON state and OFF state of the third BJT Q3. One cycle of the operation of the switch module 400 will be described hereinafter.

The process of storing magnetic energy in the transformer T1 will be described as follow. The first input terminal 401 receives a pulsating DC voltage from the main power 200. The pulsating DC voltage is applied to the base of the third BJT Q3 via the start up resistor R3, and the third BJT Q3 is turned on. As the diode D1 is reversely biased by the pulsating DC voltage, a current flows from the primary winding P1 and through the third BJT Q3 to ground. A self induced EMF (Electromotive Force) $\xi_1$ is produced across the primary winding P1 by the pulsating DC component of the pulsating DC voltage. A mutual induced EMF $\xi_2$ is produced across the secondary winding S1, and a mutual induced EMF $\xi_3$ is produced across the feedback winding P2.

The mutual induced EMF $\xi_2$ has a polarity causing the diode D4 to be reversely biased, thereby a magnetic energy is stored in the transformer T1. The mutual induced EMF $\xi_3$ produced across the feedback winding P2 is applied to the base of the fourth BJT Q4 via the resistor R8, R9, and the diode D3. At the same time, the capacitor C5 starts to be charged. The mutual induced EMF $\xi_3$ is also applied to the base of the third BJT Q3 in addition to the voltage applied to the third BJT Q3 by the first input terminal 401 via the resistor R3. As a result, the third BJT Q3 is further conducted, causing the current flowing from the primary winding P1 to the collector of the first BJT Q3 to be further increased. And the mutual induced EMF $\xi_2$ and $\xi_3$ produced across the primary winding S1 and the feedback winding P2 are respectively increased accordingly. By way of such a positive process, the third BJT Q3 comes into saturation very quickly.

When the third BJT Q3 is saturated, the voltage generated across the resistor R6 is applied to the base of the fourth BJT Q4 via the resistor R5, causing the fourth BJT Q4 to be turned on. The fourth BJT Q4 serves as a shunt path, causing the current flowing from the input terminal 401 to the base of the third BJT Q3 to be decreased. As such, the third BJT Q3 is cut off. When the third BJT Q3 is cut off, the voltage at the collector of the third BJT Q3 rises rapidly, and a pulse current is generated to flow through the capacitor C3 and the resistor R4. The capacitor C3 and the resistor R4 function as a buffer. The pulse current then flows into the fourth BJT Q4, causing the fourth BJT Q4 to be further conducted and the third BJT Q3 is further cut off accordingly.

In addition, when the third BJT Q3 comes out of saturation, an equivalent resistor between the collector and the emitter of the fourth BJT Q4 is increased. As such, the current flowing through the third BJT Q3 is decreased.

A self induced EMF $\xi_1'$ is produced across the primary winding P1 as the current flowing therethrough decreases. Mutual induced EMF $\xi_2'$, $\xi_3'$ are produced across the secondary winding S1 and the feedback winding P2 respectively. The mutual induced EMF $\xi_2'$, $\xi_3'$ have opposite polarity with regard to the mutual induced EMF $\xi_2$, $\xi_3$ respectively. The mutual induced EMF $\xi_3'$ has the same polarity with the charged capacitor C5, so that the third BJT Q3 is further cut off by the two superposed voltages.

When the third BJT Q3 is cut off, the induced EMF $\xi_2'$ causes the diode D4 to be forward conducted, by which the transformer T1 begins to release magnetic energy. The capacitor C7, the inductor L1, and the capacitor C8 perform rectifying and filtering process, and a stable DC voltage is produced at the output terminal 403.

When the magnetic energy stored in the transformer T1 has been released, the voltage across the capacitor C5 decreases accordingly. The third BJT Q3 is turned on again. The transformer T1 starts to store magnetic energy again with the same process described above. Therefore, the switch module 400 provides a stable DC voltage by switching the transistor Q3 between the ON state and the OFF state cycle by cycle.

When the outputted voltage from the output terminal 403 has variation, the outputted voltage can be regulated at a predetermined level by the sampling circuit 413. The regulating process will be described hereinafter.

If the outputted DC voltage at the output terminal 403 rises, a voltage across the resistor R12 increases accordingly. Regarding the voltage applied at the reference terminal of the reference voltage generator V1, a current flowing through the light emitting diode U1A is increased. By detecting the intensity of the light emitted from the light emitting diode U1A, a current flowing through the light receiving transistor U1B is increased. The light receiving transistor U1B serves as a shunt path, causing the current flowing through the third BJT Q3 to be decreased. The third BJT Q3 can come out of the cutoff state more easily. As such, the magnetic energy delivered from the primary winding P1 to the secondary winding S1 is decreased, and the outputted voltage at the output terminal 403 is decreased accordingly.

In a similar way, when the outputted voltage at the output terminal 403 decreases, more magnetic energy is coupled to the secondary winding S1 from the primary winding P1, and the outputted voltage at the output terminal rises up. The outputted voltage can also be regulated at a predetermined level.

Therefore, the outputted voltage can be regulated at a predetermined level in despite of the outputted voltage at the output terminal 403 has changes.

The operation of the switch module 400 in combination with the sensor module 300 will be described.

When the infrared sensor 312 in the sensor module 300 doesn't receive any infrared rays, no voltage signal is outputted to the delay circuit 314. The delay circuit 314 then outputs a low level voltage signal to the base of the first BJT Q1, causing the first BJT Q1 to be turned off. A high level voltage signal is generated at the collector of the first BJT Q1. The second BJT Q2 is turned on by receiving a high level voltage signal from the collector of the first BJT Q1. The second BJT Q2 outputs a low level voltage signal (i.e. the control signal S301) via the resistor R2 to the output terminal 302. The low level control signal S301 is applied to the base of the third BJT Q3, and the third BJT Q3 is turned off. As the third BJT Q3 cannot be switched between the ON state and the OFF state, the self-oscillating circuit 411 cannot start to oscillate. As a result, the magnetic energy cannot be coupled from the preliminary winding P1 to the secondary winding S1 accordingly. As such, the output terminal 403 of the switch module 400 has no stable DC voltage outputted, i.e. the switch module 400 is switched off 100. Such that, by detecting the absence state of the person or persons in the localized area, the power saving circuit 100 is switched off for not providing stable DC voltage so as to achieve a power saving function.

When the infrared sensor 312 detects infrared rays in the localized area, a high level voltage signal is outputted from the delay circuit 314 to the drive circuit 315. The first BJT Q1 is turned on and the second BJT Q2 is turned off. As a result, the output terminal 302 of the infrared sensing circuit 300 is floated, and no control signal S301 is outputted. The switch module 400 is equivalent as being disconnected with the sensing circuit 300. The ON state and the OFF state of the third BJT Q3 are not affected, and the switch module 400 is switched on. Such that, by detecting the presence state of the person or persons in the localized area, the power-saving circuit 100 is switched on for providing continuous stable DC voltage to the load.

It should be noted that the power-saving circuit 100 wouldn't provide stable DC voltage to the load, if the main power 200 doesn't provide pulsating DC voltage to the switch module 400. That is to say, the outputted voltage at the output terminal 403 is both controlled by the pulsating DC voltage received by the first input terminal 401 and the control signal S301 received by the second input terminal 302.

In practical applications, if the infrared sensor 312 detects that the person or persons have left the localized area of the viewing range, the delay circuit 314 prevents the switch module 400 from immediately being turned off. A predetermine amount of time is allowed to pass before the switch module 400 being turned off. If a person returns before the expiration of that predetermined amount of time, the switch module 400 will not be turned off. This operation provides the advantage that if a person leaves the viewing range or the localized area for only a short period time and then returns, the switch module 400 will not rapidly change the outputted stable DC voltage in an annoying fashion. It is preferably that the delay is 10 to 15 minutes. Of course, the amount of time could be adjusted to accommodate the usage of the area being viewed and the likelihood and frequency that persons will exit and return to that area.

As described above, the present infrared power-saving circuit 100 provides the advantage that a stable DC voltage can be outputted without using mechanical switch. The sensor module 300 is directly connected to the switch module 400 to control the DC voltage output state of the switch module 400. When no person or persons is detected in the localized area, the switch module 400 is switched OFF by the control signal S301 outputted from the sensor module 300, such that the switch module 400 cannot provide stable DC voltage to the load. As such, not only a power-saving function can be achieved, but also the electronic devices with the power-saving circuit 100 can extend their life.

Other embodiments of the present invention will be appear to those skilled in the art from consideration of the specification and practice of the invention disclosed herein. It is intended that the specification and examples to be considered as exemplary only, with a true scope and spirit of the invention being indicated by the following claims.

What is claimed is:

1. A power-saving circuit for saving electrical power, comprising:

a detector adapted for detecting infrared rays in a localized area, and outputting a voltage signal indicating the infrared rays are detected or not detected;

a driving circuit connected to the detector, the driving circuit configured for receiving the voltage signal from the detector and outputting a control signal, the control signal being at a first state corresponding to the voltage signal indicating that the infrared rays are detected and the control signal being at a second state corresponding to the voltage signal indicating that the infrared rays are not detected; and a switch module connected to the driving circuit, the switch module configured for converting a pulsating direct current (DC) voltage received by the switch module to a stable DC voltage when the switch module receives the control signal at the first state, and not outputting the stable DC voltage when the switch module receives the control signal at the second state, when the infrared rays are detected in the localized area, the voltage signal outputted from the detector is at a high level; when no infrared rays are detected in the localized area, the voltage signal outputted from the detector is at a low level, the driving circuit comprises a first transistor and a second transistor, a base of the second transistor is connected to a collector of the first transistor; when the base of the first transistor receives the low level voltage signal, the first transistor is turned off, the second transistor is turned on, and the first state of the control signal outputted from the driving circuit is at a low level; when the base of the first transistor receives the high level voltage signal, the first transistor is turned on, the second transistor is turned off, and the second state of the control signal outputted from the driving circuit is disconnected.

2. The power-saving circuit as claimed in claim 1, wherein the first transistor and the second transistor are Bipolar Junction Transistor.

3. The power-saving circuit as claimed in claim 1, wherein the switch module comprises a self-oscillating circuit and a switch power circuit connected to the self-oscillating circuit, the self-oscillating circuit comprises a third transistor and the self-oscillating circuit is configured for switching the third transistor between an ON state and an OFF state periodically, causing the switch power circuit to provide or not provide the stable DC voltage.

4. The power-saving circuit as claimed in claim 3, wherein the base of the third transistor is coupled to the collector of the second transistor, the third transistor is configured for receiving the control signal outputted from the driving circuit;

when the base of the third transistor receives the disconnected control signal, the self-oscillating circuit is oscillating, causing the stable DC voltage to be outputted from the switch power circuit;

when the base of the third transistor receives the low level state control signal, the third transistor is turned off, and the self-oscillating circuit is not oscillating, causing the stable DC voltage not to be outputted from the switch power circuit.

5. The power-saving circuit as claimed in claim 3, wherein the power-saving circuit further comprises a delay circuit, the delay circuit is electrically coupled between the driving circuit and the detector, the delay circuit is configured for delaying the low level voltage signal outputted from the sensor a predetermined amount of time when no infrared rays are detected in the localized area.

6. A power-saving circuit for saving electrical power, comprising:

an infrared sensor module configured for sensing whether an intensity of infrared rays is higher or lower than a predetermined value, and outputting a control signal corresponding to the intensity of the infrared rays; and a power supply circuit connected to the infrared sensor module, the power supply circuit configured for receiving a pulsating direct current (DC) voltage and converting the pulsating DC voltage to a stable DC voltage based on the control signal outputted from the infrared sensor module; and the power supply circuit not outputting the stable DC voltage when the intensity of the infrared rays is lower than the predetermined value, the infrared sensor module comprises an infrared sensor, and a driving circuit is connected to the infrared sensor, the infrared sensor is configured for receiving the infrared rays, and outputting a voltage signal indicating whether the intensity of the infrared rays being detected is higher or lower than a predetermined value; the driving circuit is configured for receiving the voltage signal, and outputting the control signal at different states to the power supply circuit for controlling the stable DC voltage being outputted or not being outputted, the power-saving circuit further comprises a delay circuit, the delay circuit is electrically coupled between the driving circuit and the detector, the delay circuit is adapted for delaying the voltage signal outputted from the sensor a predetermined amount of time when the intensity of the infrared rays being detected is lower than the predetermined value.

7. The power-saving circuit as claimed in claim 6, wherein the power supply circuit comprises a transistor, and a transformer connected to the transistor, the transistor is switched between an ON state and an OFF state by the control signal outputted from the driving circuit for storing magnetic energy and releasing magnetic energy respectively.

8. The power-saving circuit as claimed in claim 7, wherein the collector of the transistor is connected to the driving circuit, when the intensity of the infrared rays being detected is lower than the predetermined value, the control signal outputted from the driving circuit is at a low level, causing the transistor to be switched off, and the switch power supply circuit not supplying the stable DC voltage.

9. The power-saving circuit as claimed in claim 7, wherein the power supply circuit comprises a first transistor and a second transistor, the collector of the first transistor is connected to the base of the second transistor, when the intensity of the infrared rays being detected is lower than the predetermined value, the voltage signal outputted from the infrared sensor causes the first transistor to be turned on and the second transistor to be turned off, such that the control signal outputted from the driving circuit is at the low level.

10. A power-saving circuit for saving electrical power, comprising:

a third transistor for switching between an ON state and an OFF state, the base terminal of the third transistor configured for receiving a pulsating direct current (DC) voltage;

a transformer electrically coupled to the third transistor, the transformer configured for receiving the pulsating DC voltage and converting the pulsating DC voltage to a stable DC voltage based on switching the third transistor between the ON state and OFF state; and an infrared sensor coupled to the base terminal of the third transistor for providing a control signal indicating an absence state of infrared rays in a localized area, the control signal is outputted to the base of the third transistor when the infrared rays are detected in the localized area, the third transistor is switched off, and no stable DC voltage is outputted from the and further comprises a driving circuit, the driving circuit is coupled between the infrared sensor and the third transistor; the driving circuit comprises a first transistor and a second transistor cascaded to the first transistor; and when the infrared rays are detected in the localized area, the infrared sensor outputs a high level voltage signal to the first transistor, the first transistor is turned on, and the second transistor is turned off causing the driving circuit to be disconnected with the third transistor; when the infrared rays are not detected in the localized area, the infrared sensor outputs a low level voltage signal to the first transistor, the first transistor is turned off, and the second transistor is turned on causing the control signal to be at the low level.

11. The power-saving circuit as claimed in claim 10, wherein when the infrared rays are detected in the localized area, the control signal outputted from the infrared sensor causing the infrared sensor to be disconnected with the third transistor.

12. The power-saving circuit as claimed in claim 10, wherein when the infrared rays are not detected in the localized area, the control signal outputted from the infrared sensor is at a low level.

13. The power-saving circuit as claimed in claim 10, wherein the power-saving circuit comprises a delay circuit, the delay circuit is coupled between the infrared sensor and the driving circuit, the delay circuit is configured for delaying the voltage signal at a predetermined amount of time to the driving circuit, when the infrared rays are detected out of the localized area.

* * * * *